United States Patent
Katzenberger et al.

[11] Patent Number: 5,867,175
[45] Date of Patent: Feb. 2, 1999

[54] METHOD AND APPARATUS FOR SCRIPING ANIMATION

[75] Inventors: Gary Shon Katzenberger, Woodinville; Donald Glen MacKinnon, Seattle, both of Wash.

[73] Assignee: Microsoft Corporation, Redmond, Wash.

[21] Appl. No.: 653,201

[22] Filed: May 24, 1996

[51] Int. Cl.[6] .................................................. G06T 1/00
[52] U.S. Cl. ............................................................. 345/473
[58] Field of Search ...................... 345/302, 473, 345/335, 339, 348, 349, 949–950, 952, 956, 957; 395/685, 705–710

[56] References Cited

U.S. PATENT DOCUMENTS

| | | | |
|---|---|---|---|
| 4,398,249 | 8/1983 | Pardo et al. | 395/705 |
| 4,884,972 | 12/1989 | Gasper | 434/185 |
| 5,386,570 | 1/1995 | Lindhorst | 395/707 |
| 5,388,993 | 2/1995 | McKiel et al. | 434/118 |
| 5,404,528 | 4/1995 | Mahajan | 395/685 |
| 5,410,681 | 4/1995 | Jessen et al. | 395/500 |
| 5,442,779 | 8/1995 | Barber et al. | 707/4 |
| 5,442,790 | 8/1995 | Nosenchuck | 395/707 |
| 5,446,902 | 8/1995 | Islam | 395/703 |
| 5,452,435 | 9/1995 | Malouf et al. | 395/550 |
| 5,515,490 | 5/1996 | Buchanan et al. | 395/154 |
| 5,526,479 | 6/1996 | Barstow et al. | 395/152 |
| 5,640,590 | 6/1997 | Luther | 395/806 |

OTHER PUBLICATIONS

Anonymous, "About TVML", http://www.tvml.co.uk/developer/about.htm Mar. 1996.

Sorenson, "Sun's Java Language—An introduction", http://www.rc.kyushu-u.ac.jp/~higuchi/labo/labo3/java.html Jan. 1996.

*Primary Examiner*—Joseph H. Feild
*Attorney, Agent, or Firm*—Jones & Askew

[57] ABSTRACT

A computer-implemented system for scripting an animation sequence. The scripting system creates an instance of a script interpreter in response to an event. The script interpreter instance is assigned to a graphical object (GOB) having a graphical image associated with the animation sequence, and is invoked in response to an event received by the GOB. A script is attached to the script interpreter instance, the attached script comprising control logic for implementing the animated sequence. The control logic supports interactive animation by enabling the attached script to communicate with another GOB or another program module, such as an application program. The attached script is executed on the script interpreter instance to conduct the animated sequence. In response to executing the script, the animated sequence is displayed. The attached script and the script interpreter are destroyed in response to executing the attached script.

23 Claims, 6 Drawing Sheets

METHOD AND APPARATUS FOR SCRIPING ANIMATION

FIELD OF THE INVENTION

This present invention is generally directed to an interpreted scripting language and, more particularly, to an interpreted scripting language for encoding and controlling an animation of a graphical object.

BACKGROUND OF THE INVENTION

In the animated film classic "Steamship Willie", which introduced an animated character called "Mickey Mouse" to the entertainment world, Walt Disney relied upon a team of illustrators to hand draw the thousands of animation cells required to create an animated feature film. Although the creation of an animation sequence remains a time-consuming, detailed artistic practice, animation techniques have advanced from hand-drawn animation cells to computer-generated renderings. These computer-supported animation techniques are commonly used by artists to create animated sequences for movies, television programs, computer programs, and video games.

Computer programs are available to address the animation of an object based on the use of an animation table. An animation table typically contains a list of delays, positions, and bitmaps. Based on the entries in the animation table, an animation is completed by drawing the correct bitmap at a specified screen location after a predetermined delay has occurred. For example, to generate a relatively simple animated activity of an object "walking" between a start and an end position, an animation table contains multiple entries specifying the placement and timing of bitmaps representing the images of leg movement. Each entry dictates drawing a particular walking position at a specified time interval to capture the desired animation of a walking object.

An animation table can be viewed as a "hard-coded" animation technique because the animation is restricted to the precise limitations set forth by the entries in the table. The object will be animated in the manner dictated by the animation table, without deviation, because the table entries lack the flexibility offered by a control logic mechanism. In a table-driven animation system, each position and time for drawing the object must be specified prior to the animation. Thus, the conventional animation table can be viewed as a menu of graphical images, specified by a combination of bitmaps, screen locations and timing entries, which effectively limits the field of possible animation options.

Animation accomplished by the use of animation tables can be difficult for applications requiring an animated object to react to other objects within its environment. For example, it can be a difficult task to synchronize the interaction of objects by the use of a single animation table. Synchronization is typically accomplished by developing multiple tables, each specifying a particular action, which must be executed in a predetermined manner. For complex multi-media applications, this synchronization task is further complicated by a need to link the animation of interactive objects with sounds.

In view of the foregoing, there is a need for computer-implemented system for generating an interactive animation that allows an animated object to respond to events within the animation environment, including other objects, user-generated events, and system-level events. The present invention provides a flexible animation system for encoding an interactive animation by combining conventional animation information, such as delay, position, and image, with logic to control the animation.

SUMMARY OF THE INVENTION

The present invention addresses the above-described needs by providing an interpreted scripting language for encoding and controlling an animation. To display an animation of a graphical object (GOB) on a pixel-oriented output device, a script interpreter object is invoked to execute a list of script instructions. The script interpreter can be instantiated as an object within an animation application program. The scripting language supports the use of variables, logic-based calculations, queries to other graphic objects, and interaction with predefined system components, such as mouse events. This allows a "marriage" between traditional animation information used in hard-coded instruction lists and control logic for controlling the animation of a graphical image represented by a GOB.

Each screen element presented by the animated program on a screen is represented by a GOB. Scripts are generally attached to a GOB, thereby giving the instructions of each attached script a context for execution. Thus, scripts can be viewed as methods on a GOB. To represent the animation of a GOB, an instance of the script interpreter is invoked. For example, an event handler of the application program can pass certain trigger events, such as mouse-related events, to the GOB to invoke a script. Scripts are typically invoked in response to an input action, such as the placement of a cursor over the graphical image of a GOB or a mouse click while the cursor is placed over the graphical image.

Each animation script contains a list of function statements, also called instructions, to execute animation functions. The instructions of the animation script are supplied to a script interpreter. In response, the operands and operation codes ("op codes") are parsed from the instruction set and processed. The script interpreter executes instructions on a continuous basis until the end of the script is reached or a command is executed to pause or "delay" the script. An instruction can include control logic that supports branching to another instruction, thereby leading to processing of instructions in a non-sequential manner. The script operations of the interpreter are typically supported by a run-time stack and an instruction pointer for tracking the position of instructions within a script.

In view of the foregoing, an object of the present invention is to provide an interpreted scripting language for encoding and controlling an animation.

Another object of the present invention is to provide a computer-implemented scripting system for generating an interactive animation that allows an animated object to respond to events within its animation environment.

Another object of the present invention is to provide a flexible animation system for synchronizing the images and sounds of objects in a multi-media environment.

That the present invention achieves these objects and fulfills the needs described hereinabove will be appreciated for the detailed description to follow and the appended drawings.

DETAILED DESCRIPTION

Figure 1:
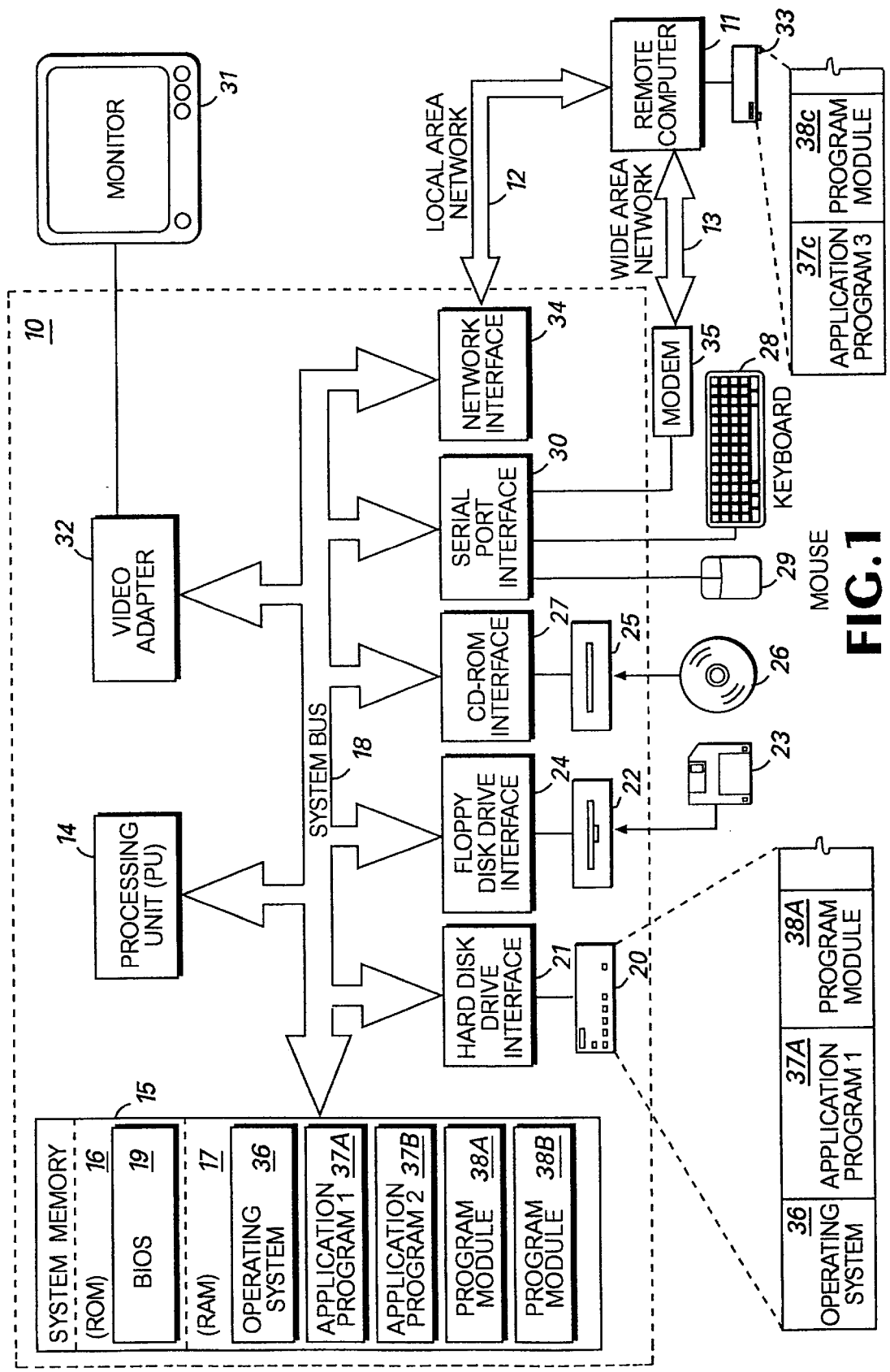
FIG. 1 is a block diagram illustrating the operating environment for the preferred embodiment of the present invention.

The present invention is directed to a computer-implemented system for scripting an animation sequence. The scripting system can create an instance of a script interpreter for executing instructions defined by an attached animation script. The script interpreter instance is assigned to a graphical object (GOB), which can be represented by one or more graphical images, any one of which is displayed at a particular time. A script interpreter instance is typically invoked in response to an event received by the GOB. A script, which is attached to the script interpreter instance, typically comprises control logic for implementing the animated sequence. The control logic supports interactive animation by enabling the attached script to communicate with another GOB or a program component, such as an event handler or dispatcher. The attached script is executed by the script interpreter instance to conduct the animated sequence and, in response, the animated sequence is displayed on a screen for viewing by a user. The attached script and the script interpreter are destroyed in response to termination of the attached script.

Those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet. Accordingly, it will be understood that the terms computer, operating system, and application program generally include all types of computers and the program modules designed for them.

The detailed description which follows is represented largely in terms of processes and symbolic representations of operations by conventional computer components, including a processing unit (PU), local memory storage devices, display devices, and input devices. Furthermore, these processes and operations may utilize conventional computer components in a heterogeneous distributed computing environment, including remote file servers, computer servers, and memory storage devices. Each of these conventional distributed computing components is typically accessible to the local PUJ by a communication network.

The processes and operations performed by the computer include the manipulation of electrical signals by a local PU or remote server, and the maintenance of these signals within data structures resident in one or more of the local or remote memory storage devices. Such data structures impose a physical organization upon the collection of information, such as data bits, stored within a memory storage device and represented by specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require manipulations of physical quantities. Usually, though not necessarily, these quantities take the form of electrical, magnetic, or optical signals capable of being stored, transferred, combined, compared, copied, or otherwise manipulated. It is conventional for those skilled in the art to refer to these signals as bits, bytes, values, elements, symbols, characters, instructions, function statements, commands, records, objects, images, files or the like. It should be kept in mind, however, that these and similar terms should be associated with appropriate physical quantities for computer operations, and that these terms are merely conventional labels applied to physical quantities that exist within and during operation of the computer.

In addition, it should be understood that the programs, processes, and methods described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, the present invention and the preferred operating environment will be described.

The Computing Environment

FIG. 1 illustrates various aspects of the preferred computing environment in which the present invention is designed to operate. Those skilled in the art will immediately appreciate that FIGS. 1 and 2 and the associated discussion are intended to provide a brief, general description of the preferred computer hardware and program modules, and that additional information is readily available in appropriate programming manuals, user guides, and similar publications.

FIG. 1 illustrates a conventional computer 10 suitable for implementing the operating environment for the preferred embodiment of the present invention. As shown in FIG. 1, the computer 10 is operated in a networked environment with logical connections to a remote computer 11. The logical connections between the computer 10 and the remote computer 11 are represented by a local area network 12 and a wide area network 13. Those persons skilled in the art will recognize that the remote computer 11 may function as a file server or compute server in this client/server configuration.

The computer 10 includes a processing unit (PU) 14, such as the 80486 or "PENTIUM" microprocessors manufactured by Intel Corporation of Santa Clara, Calif. It will be understood that the computer 10 can include other PU models, such as a member of the MIPS family by Silicon Graphics, Inc. or a PowerPC processor by Motorola Corporation. The computer 10 also includes system memory 15 (including read only memory (ROM) 16 and random access memory (RAM) 17), which is connected to the PU by the system bus 18. A basic input/output system (BIOS) 19 for the preferred computer 10 is stored in ROM 16. Those skilled in the art will recognize that the BIOS 19 is a set of basic routines that helps to transfer information between elements within the computer 10.

Within the computer 10, a local hard disk drive 20 is connected to the system bus 18 via the hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the computer 10 by using an input device, such as a keyboard 28, and/or a pointing device, such as a mouse 29, which are connected to the system bus 18 via a serial port interface 30. Other types of pointing devices (not shown in FIG. 1) include track pads, track balls, head-tracker, pen, data glove, and other devices suitable for positioning a cursor on a video monitor 31. The video monitor 31 is connected to the system bus 18 via a video adapter 32.

The video monitor 31 represents the preferred pixel-oriented output device for use with the present invention. However, the present invention is not limited to use with conventional video monitor devices, but extends to other types of pixel-oriented devices. It is well known to those skilled in the art that pixel-oriented display devices can include both active light-generating devices, such as CRT displays, and light-absorbing or blocking devices, such as back-lit LCD displays, dot matrix printers, and laser printing devices. These pixel-oriented display devices will be collectively described as display devices or output devices in this specification.

The remote computer 11 in this networked environment is connected to a remote memory storage device 33. This remote memory storage device 33 is typically a large capacity device, such as a hard disk drive, CD-ROM drive, magneto-optical drive or the like. The computer 10 is connected to the remote computer 11 by a network interface 34, which is used to communicate over the local area network 12.

As shown in FIG. 1, the computer 10 is also connected to the remote computer 11 by a modem 35, which is used to communicate over the wide area network 13, such as a distributed computing environment commonly described as the Internet. The modem 35 is connected to the system bus 18 via the serial port interface 30, and can be connected to a telephony network, such as the public switched telephone network (PSTN) or a community antenna television (CATV) network. Although illustrated in FIG. 1 as external to the computer 10, those of ordinary skill in the art will quickly recognize that a modem 35 may also be internal to the remote computer 11, thus communicating directly via the system bus 18. It is important to note that connection to the remote computer 11 via both the local area network 12 and the wide area network 13 is not required for computer operations, but merely illustrates alternative methods of providing a communication path between the computer 10 and the remote computer 11.

Although many other internal components of the computer 10 are not shown, those of ordinary skill in the art will appreciate that such computer components and the interconnection between them are well known. Accordingly, additional details concerning the internal construction of the computer 10 need not be disclosed in connection with the present invention.

Those skilled in the art will understand that program modules, such as an operating system 36, application programs 37, and other program modules 38 are provided to the computer 10 via one of the local or remote memory storage devices, which may include the local hard disk drive 20, floppy disk 23, CD-ROM 26, RAM 17, ROM 16, and the remote memory storage device 33. In the preferred computer 10, the local hard disk drive 20 is used to store data and programs, including the operating system and application programs.

Scripting System Architecture

Figure 2:
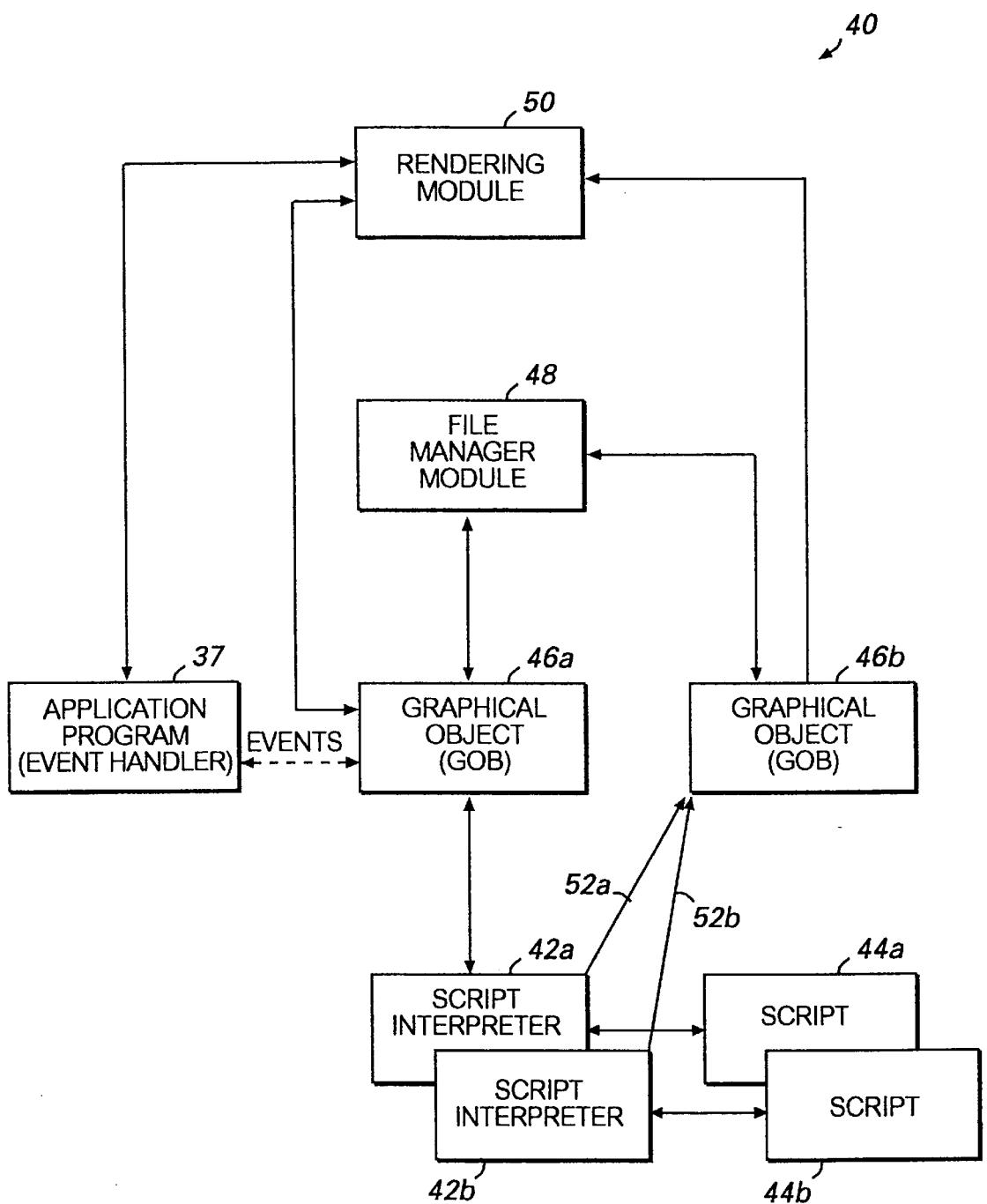
FIG. 2 is a block diagram illustrating the principal components of a the preferred embodiment of the present invention.

FIG. 2 is a block diagram illustrating the principal components of a scripting system and the program modules that communicate with the scripting system. Turning now to FIGS. 1 and 2, the application program 37a includes a scripting system 40 comprising script interpreters 42a–42b and corresponding scripts 44a–44b. Each script interpreter 42 interprets script language supplied by an attached script 44. It will be understood that FIG. 2 shows a representative example of the scripting system, in that the scripting system 40 can include additional script interpreters and attached scripts. For the preferred embodiment, only a single script is active at any particular moment of operation by the scripting system. Other scripts, however, can wait for execution of the active script to be completed.

A new instance of a script interpreter 42 is created in response to invoking execution of a script 44. Each script interpreter 42 is attached to a graphical object (GOB) 46. For example, the script interpreter 42a is attached to the GOB 46a, the GOB 46b is attached to the script interpreter 42b, and so forth. Each GOB has a unique identifier known as an identification code or "id". For this object-oriented model, the scripts 44 can be viewed as methods of the GOBs 46. Each GOB 46 provides a context for the execution of a script 44 on a corresponding script interpreter 42. A local variable can be attached to a script 44. Other variables are attached to a GOB 46. The variables of the scripting system 40 will be described in more detail with respect to FIG. 5.

Scripts, such as the scripts 44a and 44b, are attached to instances of script interpreters, specifically the script interpreters 42a and 42b. Each script includes a script name by which the script may be accessed by its GOB 46. A script typically contains function statements, also described as command statements or instructions, for implementing desired operations. These operations are performed in response to execution by a script interpreter of a script containing the function statements. For the preferred embodiment, the scripts 44 support animation functions. The scripting system is feature rich and supports variables, calculations, queries to other objects, such as GOBs 46, interaction with system components, such as the event dispatcher of the application program 37a and the operating system 36, sound invocation, and so forth. In addition, the scripting system 40 contains primitives to support the rendering of bitmapped animation cells to set the visual representation of a GOB 46. By use of an interpreter architecture, the scripting system 40 can support an animation defined by a function statement or command executed at a particular point during the animation. Upon completion of the function statements in a script 44, the instance of the script interpreter 46 and its script are destroyed and control is returned to the application program.

Each GOB 46 can communicate with a file manager 48 and a rendering engine 50. The file manager 48 manages the data structures associated with the GOBs 46, including bitmaps or pixelmaps associated with the GOBs. For purposes of this specification, the terms "bitmaps" and "pixelmaps" are used interchangeably to identify a data structure describing a bit or pixel image held in memory, such as RAM 17. The rendering engine 50, which is responsive to the bitmaps associated with GOBS, can render the graphical images associated with these bitmaps. The rendering engine 50 determines which graphical images to draw based on status messages from the GOBs 46. The status messages define invalid states for updating a screen for presentation on the monitor 31. In this manner, the rendering engine 50 is responsible for tracking the invalid screen area to update a screen on the monitor 31.

For the preferred embodiment, the script interpreters 42, the scripts 44, the GOBs 46, the file manager 48, and the rendering engine 50 are implemented as computer program modules, such as the application program 37a or the program modules 38, each stored within a memory storage device, including the memory 15 or the hard disk drive 20. As suggested by the computing environment described with respect to FIG. 1, one or more of these program modules can be maintained on a memory storage device that is remote to the computer 10. For example, one or more of these program modules also can be downloaded from a remote site for local execution on the computer 10. An object-oriented programming architecture is preferably used for implementing the program modules of the scripting system 40.

Each GOB 46 is a graphical object having a specified location on a display screen, i.e., a registration point, and a bounding box having a location defined relative to the registration point. The registration point is generally used to line up a sequence of images presented by an animation sequence. For example, if the animation sequence illustrated a triangle spinning around a center point, the registration point typically would be defined as this center point. In this manner, the animation effect spinning the triangle in place about the center point is achieved.

In addition, the graphical image of a GOB 46 is typically defined by a bitmap and corresponding Z-order values or depth values. For example, if two graphical images of separate GOBs overlap, the Z-order values define which graphical image is placed in front of the other. The bitmap is typically maintained within a data structure, such as a container, in the file manager 48.

In general, the application program 37 receives user and system-related events via the operating system 36. For events of interest, an event dispatcher of the application program 37a can send an event message to a particular GOB 46. Specifically, a GOB 46 can advise the application program 37a that the GOB is interested in certain events, and requests that the application program forward these events to the GOB. Thus, the application program 37a includes a component that operates as an event handler to trap certain events on behalf of a requesting GOB. Typical user events include input events, such as cursor location and mouse button position, i.e., button up or button down. In response to an event message, the GOB 46 can instantiate a script interpreter object embodied by the script interpreter 42.

For example, the GOB 46a can create a script interpreter instance, specifically the script interpreter 42a, in response to an event message indicating that a user has placed the cursor on the graphical image associated with the GOB 46a and has depressed a mouse button while at this cursor location. In response, the script 44a is loaded for execution by the script interpreter 42a. Instructions or function statements of the script 44a are then executed by the script interpreter 42a.

The script 44a can include a "Pause" command, which operates to delay further execution of the script 44a for a specified time period. In addition, the script 44a can include an implied delay command associated with an animation command, such as the "Cell" command, which displays a frame of an animation for a specified time period. This delay mechanism provides the flexibility of delaying a first script while allowing another script to run on its script interpreter. For example, the script interpreter 42a can call another GOB, such as the GOB 46b, to invoke the execution of another script. Also, this delay mechanism, typically the Pause command, is useful for delaying the painting of a display screen for a certain time period. A representative example of interaction between GOBs is illustrated by the communications path 52a extending between the script interpreter 42a and the GOB 46b. A command in the script 44a can be transmitted to the GOB 46b, thereby serving as a trigger event to initiate the creation of the script interpreter 42b and execution of its script 44b. A communications path 52b also can extend between the script interpreter 42b and the GOB 46b.

A GOB 46 can be assigned one of a variety of states based on event messages received by the GOB. Consequently, information is maintained by the file manager 48 within data structures, typically static templates, to allow the GOB 46 to track its states. For example, if the GOB 46 is represented by a check box button, clicking on the graphical image of the check box button can cause the corresponding GOB to change states. If the present graphical image is a check box in the "inactive" state, the check box is empty and a check is not displayed within its boundary. However, upon clicking on the check box in the inactive state, the GOB 46 changes states and enters the "active" state. The graphical image representing the "active" state of this GOB is a check box boundary enclosing a check mark. Thus, those skilled in the art will appreciate that a GOB tracks its states to determine which graphical image should be displayed in response to a transition of states.

Figures 3A, 3B:
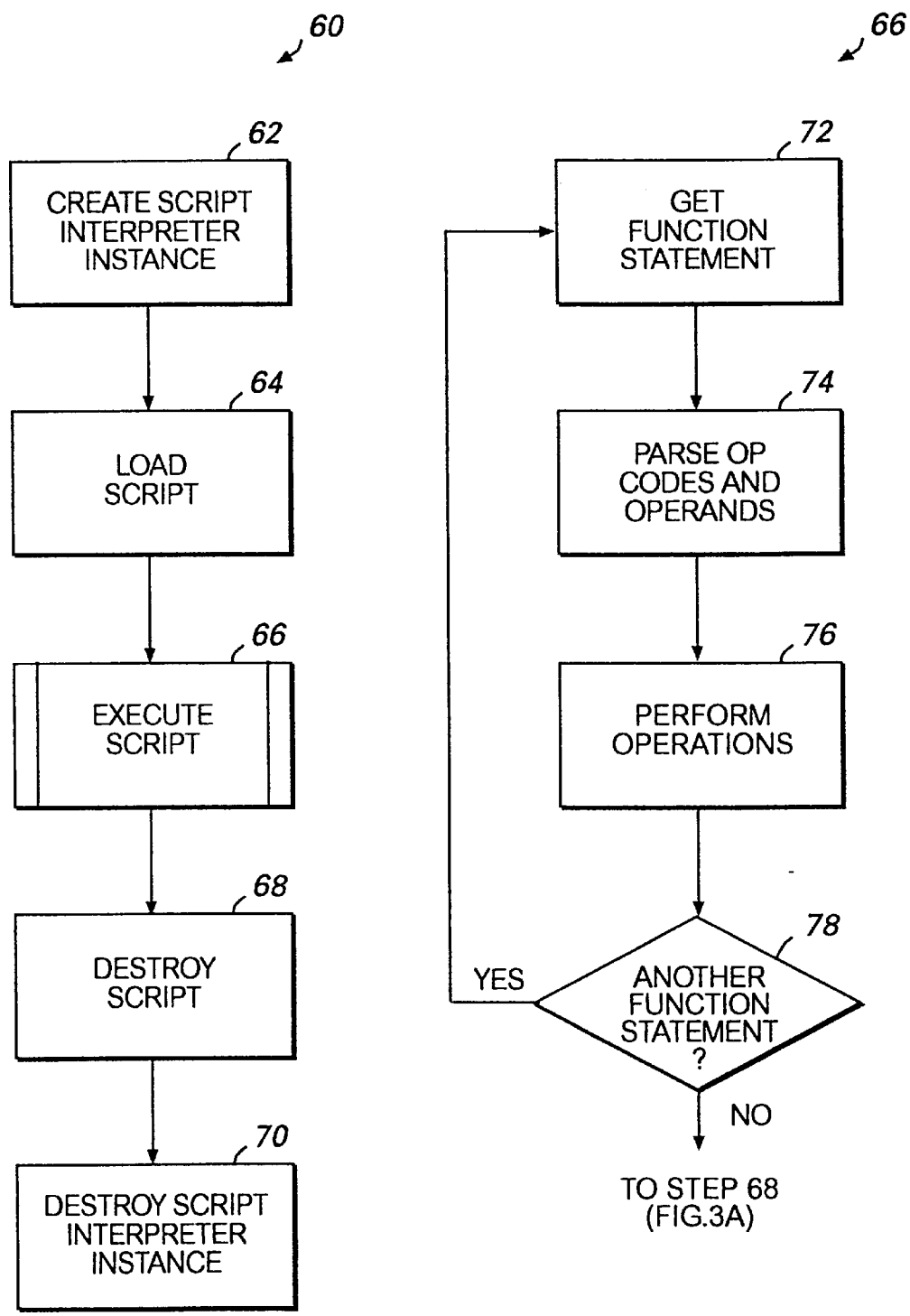
FIG. 3A is a logical flow diagram illustrating the steps of a computer-implemented scripting process in accordance with the preferred embodiment of the present invention.
FIG. 3B is a logical flow diagram illustrating the steps of executing a script in accordance with the preferred embodiment of the present invention.
Figure 3C:
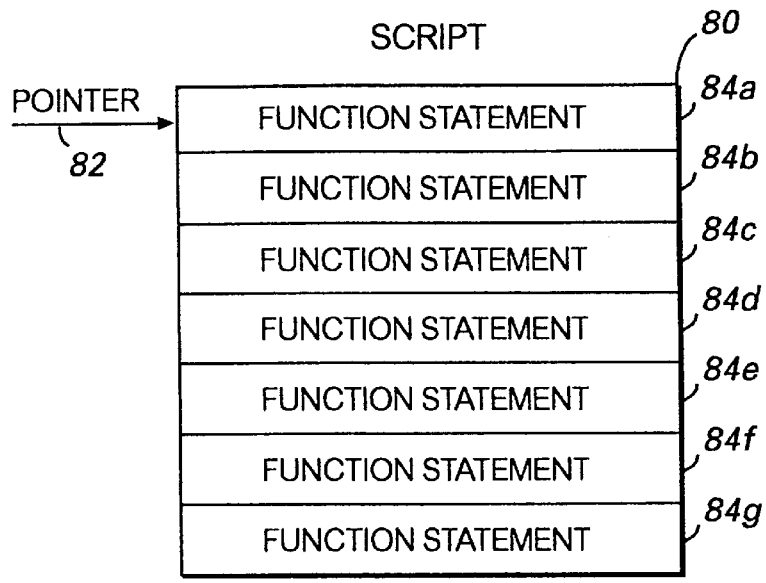
FIG. 3C is a block diagram of a script interpreter for the preferred embodiment of the present invention.

FIGS. 3A, 3B, and 3C, collectively described at FIG. 3, respectively illustrate operation of the scripting system, execution of a script by the scripting system, and the execution model for the scripting system. Referring now to FIGS. 1, 2, and 3, a computer-implemented scripting process 60 in FIG. 3A begins by invoking a script interpreter for operation on a script when a graphical object must be represented by an animation. Consequently, the scripting process is initiated in step 62 by creating an instance of a script interpreter, such as the script interpreter 42a. This instance is associated with a particular GOB, namely the GOB 46a, which defines global variables for use by a script that is executed by the script interpreter 42a. Typically, the script interpreter 42a is created in response to a trigger event, such as a mouse button position command, transmitted to the GOB 46a via the event handler of the application program 37a. Representative trigger events will be described in more detail with respect to FIG. 4. In step 64, the script 44a is loaded for execution by the script interpreter 42a.

In step 66, the script interpreter 42a runs the script 44a by processing its function statement or instructions on a sequential and continuous basis until the end of the script is reached or an instruction is executed which has a "delay" component, such as the "Cell" command. As shown in more detail in FIG. 3B, the execution step 66 can be viewed as a sequence of four separate steps forming a loop. In step 72, a function statement or instruction is obtained from the script 44*a*. For the preferred script interpreter, each function statement is obtained in the order defined by the corresponding script. In step 74, the script interpreter 44*a* responds to a selection of the function statement by preparing specified operands in step 74. In turn, the operation defined by the function statement and its operands are completed in step 76. It will be appreciated that the selected function statement can implement a control logic mechanism for supporting a logical calculation, queries to another GOB, and queries to another program module. Thus, the operation defined by the function statement and its operands may create a loop to a prior function statement within the script or a branch to another script. Those skilled in the art will appreciate that function statements are not necessarily executed in serial fashion if a script includes function statements for implementing a control logic mechanism. In the event that the script includes another function statement, a "YES" branch is followed from step 78 to step 72 to begin anew. The execution process is terminated when a determination is made that the script 44*a* contains no additional function statements In the event that all function statements have been examined, the "NO" branch is followed from step 78 to step 68 in FIG. 3A.

Referring again to FIGS. 1, 2, and 3A, the script 44*a* is destroyed in step 68 upon execution of each and every function statement of the script. Likewise, the script interpreter 42*a* is destroyed in step 70. The script interpreter 42*a* and the script 44*a* are "destroyed" in the sense that a new instance of the script interpreter is created each time it is invoked to execute a script. Those skilled in the art will appreciate that a script can be used again with a new instance of a script interpreter. Moreover, several script interpreters can run the same script.

As shown in FIG. 3C, the architecture of the preferred script interpreter 42 is defined by a list 80 and a pointer 82. During execution of a script 44, the pointer 82 is moved along the list 80 to track function statements in the script. For the representative example in FIG. 3C, the list 80 includes seven elements, which represent function statements 84*a*–84*g* of the script 44. When an instance of the script interpreter 42 is created, a portion of system memory, such as the memory 15 is allocated for use as a stack. The stack is used for temporary storage of the "scratch pad" calculations completed during execution of a script 44 by a script interpreter 42.

Figure 4:
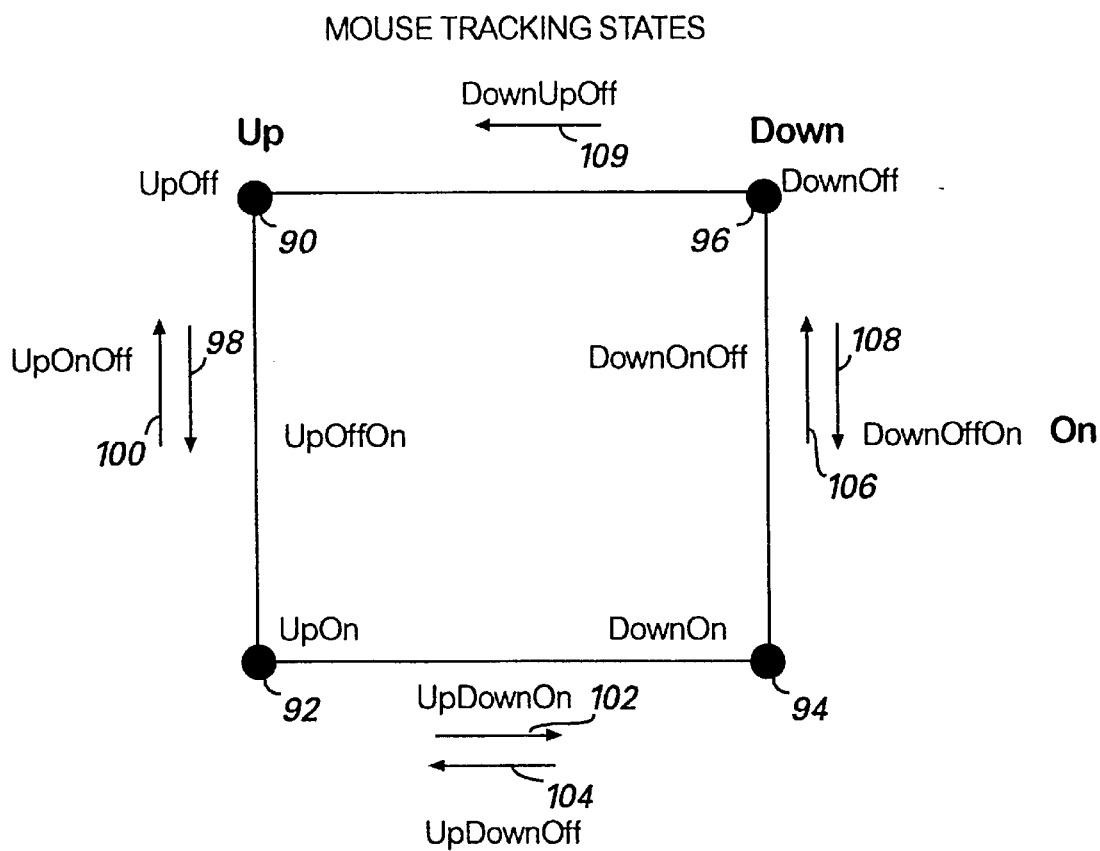
FIG. 4 is a state diagram defining predetermined events that trigger a mouse tracking action by a script interpreter of the preferred embodiment of the present invention.

FIG. 4 is a state diagram illustrating trigger events associated with mouse states for invoking a script interpreter. Referring now to FIGS. 1, 2 and 4, the states 90, 92, 94, and 96 represent static states of an input device, typically a pointing device for controlling cursor location, such as the mouse 29 having one or more buttons. For the preferred embodiment, state 90 represents placement of the cursor off of a graphical image of a GOB 46 when a mouse button is in the up position. State 92 is similar to state 90 with the exception that the cursor has now been placed proximate to the graphical image of a GOB 46. In state 94, the cursor remains on or proximate to the graphical image of a GOB 46, while the mouse button has been depressed to enter the down position. In state 96, the mouse button remains depressed while the cursor is positioned off or away from the graphical image of a GOB 46.

For each of the states 90, 92, 94, and 96, the operating system 36 typically generates a mouse-related message that is typically received by an application program, such as the application program 37. In turn, the application program 37 can send an event message to a particular GOB 46 having a graphical image and an underlying animation function associated with cursor location and mouse button state. In response to an event message, the GOB 46 determines whether the specified event serves to invoke a script interpreter 42 for executing a script 44. Typically, the GOB 46 checks the static templates maintained by file manager 48 (FIG. 2) to determine whether the event received from the application program 37 corresponds to invocation of a script interpreter instance.

The branches extending between the states 90, 92, 94, and 96 represent transitions between static states. Two different transitions are associated with each of the branches extending between the states 90 and 92, the states 92 and 94, and the states 94 and 96. In contrast, a single transition is associated with the branch extending between the states 90 and 96. In response to a transition, the GOB 46 can invoke a script interpreter 42 for executing a script 44 for an animation sequence. In contrast, the event messages representing the static states can trigger a script 44 for executing an animation, a static picture, or a video clip. Transitions 98, 100, 102, 104, 106, 108, and 109 are viewed as "transitions" because the cursor location, which corresponds to mouse movement, changes by moving onto or off of a graphical image associated with a GOB 46.

The transition 98, which is illustrated by the arrow extending along the branch between the static states 90 and 92, represents movement of the cursor from a position off of the graphical image of the GOB 46 to a position on or proximate to the graphical image when the mouse button remains in the up position. In contrast, transition 100, which is illustrated by the arrow extending along the branch between the static states 92 and 90, represents movement of the cursor from the graphical image of the GOB 46 to a position off of the graphical image while the mouse button remains in the up position.

The transition 102 is illustrated by the arrow extending along the branch between the states 92 and 94, whereas the transition 104 is represented by the arrow extending along the branch between the states 94 and 92. The transition 102 represents a transition of the mouse position from the up position to the down position while the cursor remains on or proximate to the graphical image of the GOB 46. In contrast, the transition 104 represents a transition of the mouse button positions from the down position to the up position while the cursor is placed on or proximate to the graphical image of the GOB 46.

The transition 106 is illustrated by the arrow extending along the branch between the static states 94 and 96, whereas the transition 108 is illustrated by the arrow extending along the branch between the states 96 and 94. The transition 106 represents movement of the cursor on or proximate to the graphical image of the GOB 46 to a position off of the graphical image while the mouse button is in the down position. In contrast, the transition 108 represents movement of the cursor from a position off of the graphical image of the GOB 46 to a position on or proximate to the graphical image while the mouse button remains in the down position. The transition 109 is illustrated by the arrow extending along the branch between the static states 96 and 90. The transition 109 represents a change in the mouse button position from the down position to the up position while the cursor is positioned off of the graphical image of the GOB 46.

In summary, the static states 90, 92, 94, and 96 preferably represent a state of a GOB 46 relative to a current cursor position, whereas the transitions 98, 100, 102, 104, 106, 108, and 109 represent a state of the GOB relative to a change in static states. For example, for each of the static states 90, 92, 94, and 96, a graphical image for the GOB 46 is associated with each static state. Typical graphical images or representations are defined by a bitmap or pixelmap, a rectangular fill, a tiled bitmap, a video. This graphical representation of the GOB 46 is defined by the data structures or static templates stored in the file manager 48. Specifically, the data structure specifies which graphical representation should be displayed for the GOB 46 in response to detection of one of the static states 90, 92, 94, and 96.

The transitions 98 and 100 respectively represent movement of the cursor off of or onto the graphical image for a GOB 46. The transitions 102 and 104 respectively represent movement of the cursor onto the graphical image of the GOB 46 while the mouse button position transitions between the up and down positions. The transitions 106 and 108 respectively represent movement of the cursor onto and off of the graphical image of the GOB 46 while the mouse button remains in the down position. The transition 109 represents a transition of the mouse button position from the down position to the up position while the cursor remains off of the graphical image for the GOB 46.

In view of the foregoing, it will be appreciated that a primary event for invoking a script interpreter is a "mouse click", i.e., a transition of the mouse button between the down and up positions. For example, by "clicking" on the graphical image of a GOB 46, it receives an event message regarding this event from an event handler of the application program 37a. The GOB 46 responds to this event message by examining its data structure or template within the file manager 48. Specifically, the GOB 46 examines its data structure for the action that it should take, if any, in response to this event. The data structure for the GOB 46 will specify predetermined events that are associated with execution of corresponding scripts. If the data structure dictates execution of a particular script in response to an event, the GOB 46 creates an instance of the script interpreter 42 and loads the identified script 44. The script interpreter 42 can then execute the script 44 in the manner described above with respect to FIG. 3.

Other types of events for invoking a script interpreter 42 include system level events, including signals generated by input devices of the computer 10, such as a keystroke or combination of keystrokes on the keyboard 28, as detected by the operating system 36, and supplied to the application program 37a. For example, a GOB 46 can advise the application 37a that it is interested in listening for certain keystrokes. In turn, the event dispatcher of the application program 37a can trap the messages provided by the operating system 36 regarding such keystrokes, and pass this information to the GOB 46 in the form of a queue of event messages.

Other events include timing signals generated by an application program, such as the application program 37a, in response to expiration of a predetermined time period. A timing signal is typically generated by an internal timer or counter. For example, an application program 37 or a script 42 can set a timer for a predetermined timing period and, in response, the timer will count until expiration of this time period. When the timer expires, it generates an alarm embodied by a timing signal. In response, the GOB 46 can advise the corresponding animation script interpreter to resume execution of the present script or to launch another script.

A script 44 can include function statements containing variables and non-variables. For the preferred embodiment, the scripting language can include two different types of variables, specifically local variables and GOB variables. Local variables have scope only within the context of a script 44 and, upon completing a run of the script, local variables are deleted. Consequently, no object outside of the script 44 can access a local variable. In contrast, GOB variables are attached to GOBs 46. GOB variables are accessed by a specified name and a particular GOB identifier. The GOB identifier specifies the GOB for which the variable is attached. A GOB variable can be accessed by its GOB 46 (or another GOB) for the term of the GOB. For example, if a GOB 46 is deleted or otherwise "destroyed", the variables associated with this GOB also are deleted. GOB variables are stored within a GOB 46 and persist until the GOB is destroyed. In contrast, local variables are stored within scripts 44 and persist only while the script is running.

Variables are assigned variable names, which are typically encoded by use of lower case characters, upper case characters, underscore, and digits. For the preferred embodiment, variable names can have up to eight significant characters, each having a six bit value. If a variable name is assigned more than eight characters, the script compiler will truncate the variable name to the first eight characters. There is no requirement of the scripting system 40 to declare variables because the storage for variables is preferably allocated in response to first use of a variable.

Figure 5A:
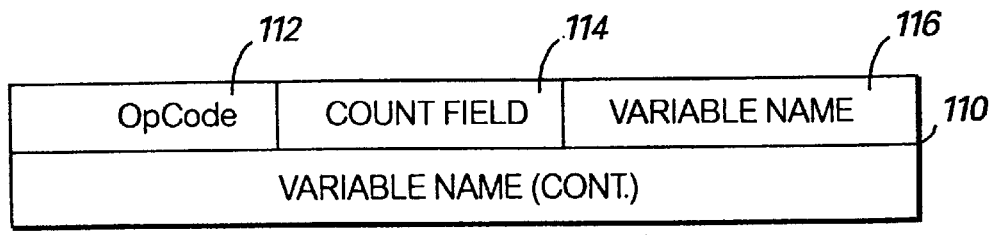
FIGS. 5A and 5B are diagrams illustrating a pair of operation codes, a variable operation code and a non-variable operation code, for the preferred embodiment of the present invention.
Figure 5B:
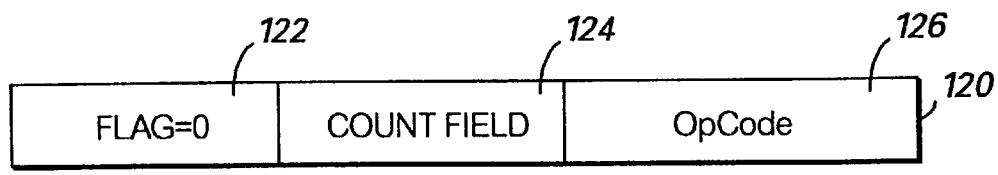

In view of the foregoing, a variable operation code for the scripting system 40 is shown in FIG. 5A and a non-variable operation code is shown in FIG. 5B. The variable operation code 110 comprises two long words defined by an array of 32 bits having a single-byte op code field 112, a single-byte count field 114, and a two-byte variable name field 116. The op code field 112 contains an operation code, which represents an instruction that specifies the type of the instruction and the structure of the data on which it operates. The count field 114 comprises a number defining the quantity of literal words that follow the field adjacent to the count field. The remaining field 116 in the variable operation code 110 is used for the variable name.

As shown in FIG. 5B, the non-variable operation code 120 comprises three single-byte fields, a definition field 122, a count field 124, and an op code field 126. The definition field 122 comprises a flag that can be set to value defining whether the element is a variable or a non-variable. For example, if the flag is set to a logical zero value, the element is a non-variable. Similar to its counterpart in the variable operation code 110, the count field 124 defines the number of literal words that follow the op code. The op code field 126 comprises an operation code.

Table I contains a listing of pseudo code representing a typical example of a script 44 of the scripting system 40. The script of Table I defines an addition operation for summing the data values of ten and seven. The resulting sum is assigned to the local variable "X".

TABLE I

PUSH 10
PUSH 7
ADD
POP LOCAL X

Figure 5C:
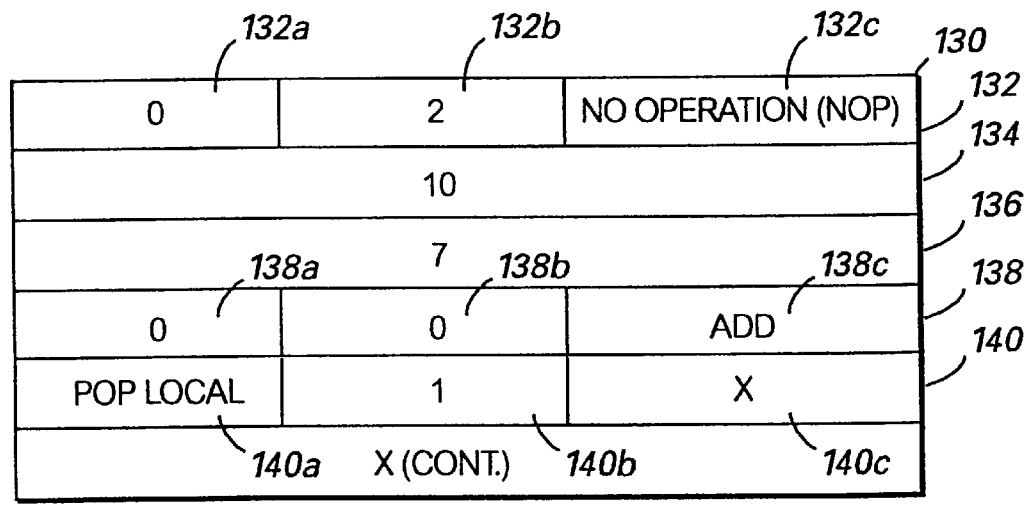
FIG. 5C is a diagram illustrating a representative example of a script interpreter in accordance with the preferred embodiment of the present invention.

FIG. 5C is a diagram illustrating an execution model corresponding to the pseudo code of Table I. The execution model 130 comprises five array elements, specifically elements 132, 134, 136, 138, and 140. The elements 132, 134, and 136 correspond to the first two instructions of the pseudo code of Table I. Turning first to array element 132, the field 132a defines this element as a non-variable operation code. The count field 132b indicates that two literal words follow the op code field 132c, which comprises a "no operation" (NOP) code. Specifically, the array elements 134 and 136 respectively contain the literals "10" and "7". The "ADD" instruction in Table I corresponds to array element 138. Array element 138 represents a non-variable, as evidenced by the state of the flag in the field 138a, which is set to a logical zero value. The count field 138b indicates that no literal words follow the op code field 138c, which contains the instruction "ADD". In contrast to the previous elements, which represented non-variables instructions and data words, the array element 140 is a variable instruction acting on a local variable "X". The op code field 140a contains the instruction "POP LOCAL", which corresponds to the final instruction in the pseudo code offered by Table I. The count field 140b indicates that a single literal word follows a local variable name in field 140c. The local variable name "X" is designated in the variable name field 140c.

The pseudo code of Table I represents a script and the execution model of FIG. 5C. Based on a run-time execution stack model, the data value of "10" and the data value "7" are pushed onto the top of the stack. Based on the instruction in the array element 138, the two data items on the stack are added and the resulting sum is placed on the top of the stack. Based on the array element 140, this sum is "popped" into the local variable "X".

The syntatic rules for the script language of the scripting system are similar to the rules for the "C" programming language. Statements are terminated by semi-colon and long statements may be broken across multiple lines. Statements may include tabs and spaces for legibility. In addition, statements may include expressions in their argument list. Adjacent strings are concatenated. Arguments are separated by commas; line comments separated by "//"; and block comments are set of by "/*" and "*/". Expressions can be formed from any combination of operators, variables, and statements that return values. The scripting system 40 preferably supports the operators of the standard "C" programming language.

Those skilled in the art will appreciate that a script, such as the script in Table I, is submitted to a compiler to develop a compiled script. The scripting system 40 is preferably supported by a conventional compiler to develop compiled scripts.

Table II contains a listing of the preferred statements for the scripting system 40 for looping and decision-making.

TABLE II

| Statement | Description |
| --- | --- |
| Exit( ); | Ends the current script. |
| Goto(label); | Jumps to label. |
| If(condition1); statement block1 [Elif(condition2); statement block2] [Else; statement block3] End; | Conditionally executes a group of statements, depending on the value of expressions. |
| IfGoto(condition, label); | Conditionally jumps to label. |
| Match(lwKey, Default, lwCompare1, Return1[, | Compares a key value to a list of argument pairs and returns the |

TABLE II-continued

| Statement | Description |
| --- | --- |
| lwCompare2, Return2] . . .) | value of a match or a default value if no match is found. |
| Select(lwIndex, Arg1[, Arg2] . . .) | Returns a specified item from the argument list. |
| While(Expression); statementblock [Continue;] statementblock [Break;] statementblock End; | Conditionally repeats a statement block. |

Both Goto and IfGoto use labels to control program flow. Label references appear as a name followed by a $ sign. Label definitions are a name followed by an @ sign.

It will be appreciated that the looping and decision-making statements support an implementation of control logic for defining an animation sequence supported by a script 44. In contrast to prior computer-implemented animation sequences, the preferred scripting system 40 captures the functionality of a table driven scripting system by use of logical statements within a script. The statements of Table II allow the construction of a script that can test for certain animation conditions and, in response to a known condition, branch to another function statement in the script to conduct an operation. In addition, the statements support the construction of a script that defines an animation sequence based on random-generated values. For example, the scripting system 40 supports the construction of a script that defines a display of a desired animation sequence in response to a random time delay. Another representative example supported by the preferred scripting system 40 is a script that tests whether a particular graphical image corresponding to a GOB is displayed on a screen and, if so, then conducting an animation sequence associated with another GOB. Consequently, the scripting system 40 supports the construction of a single script for conducting an animation sequence rather than multiple animation tables.

A typical animation sequence may reuse a set of bitmaps to achieve the desired sequence of graphical images. For example, a walking sequence may comprise four separate bitmaps defining the graphical images associated with walking steps. The preferred scripting system can use the decision-making statements of Table II to reuse these four bitmaps in a predetermined manner until a graphical image associated with the walking steps has reached a selected location on the screen. A script 44 for implementing this animated walking sequence uses a decision-making statement to cycle through the four bitmaps until a test condition is satisfied in response to the character reaching the predetermined screen location. At this point, the animation script can terminate because the character has reached the predetermined screen location.

In view of the foregoing, it will be appreciated that a script 44 can control how a graphical image associated with a graphical object 46 can behave on a screen and how the GOBs react to trigger events, such as user actions (or inaction). A script 44 can be defined by a set of functional statements having variables, non-variables (data items), and operators. The scripting system 40 comprises script key words for constructing functional statements. Selected script key words or operators are shown below in Table III, as follows:

TABLE III

RunScriptGob, RunScriptThis

Runs a script contained in a GOB.
Syntax
RunScriptGob(*gidParent, chidScript* [, *arguments*])
RunScriptThis(*chidScript* [, *arguments*])

| Argument | Description |
| --- | --- |
| lwArgCount | Number of arguments used by the script. |
| gidParent | ID of the script's GOB. |
| chidScript | Child ID of the script to run. |
| arguments | List of arguments used by the script being run. Multiple arguments are separated by commas. |

Return Value
Determined by the Return or SetReturn statement used in the script being called.
SetReturn Ends a script and returns the specified value (if any).
Syntax
Return([*iw*/*Return*])
The argument *IwReturn* is the value to return.
Return Value
None
Remarks
To return a value without immediately ending a script, use SetReturn.
XGob, XThis Returns x-coordinate of a GOB in pixels.
Syntax
XGob(*gid*)
XThis( )
The *gid* argument is the GOB ID of the GOB for which to return the x coordinate.
Return Value
Long.
Remarks
The x coordinate of a GOB is the horizontal distance between the referenced point of the GOB and the reference point of its parent GOB. The default reference point of the top-level GOB is the upper-left corner of the window associated with the application program.
XMouseGob, XMouseThis Returns the mouse's x-coordinate within a GOB in pixels.
XMouseGob(*gid*)
XMouseThis( )
The *gid* argument is the GOB ID of the GOB for which to return the X mouse coordinate.
Return Value
Long.
Remarks
The x coordinate of the mouse is the horizontal distance between the referenced point of the GOB and the reference point of the mouse pointer. The default reference point of the top-level GOB is the upper-left corner of the window associated with the application program.
ZGob, ZThis Returns z order of a GOB.
ZGob(*gid*)
ZThis( )
The *gid* argument is the GOB ID of the GOB for which to return the z order.
Return Value
Long
Remarks
The z-order of GOBs on screen determines their drawing precedence. Use ZGob and ZThis to determine the order of display.
Cell Displays a frame of an animation for a specified length of time.
Syntax
Cell(*chid, iwX, IwY, IwTime*);

| Argument | Description |
| --- | --- |
| chid | Child ID of the bitmap to display as a frame. |
| IwX | Horizontal coordinate to display the frame at. |
| IwY | Vertical coordinate to display the frame at. |
| IwTime | Length of time to delay before the next display. |

TABLE III-continued

Return Value
None
Remarks
Use *chid* chidNil (0xFFFFFFFF) to avoid changing the GOB's appearance. This script keyword is useful for moving an object on screen or for polling for events.
The *IwX* and *IwY* coordinates are relative to the upper-left corner of the container GOB and are based on the current GOB's reference point. The Cell command supports an implied pause or delay.
Pause Pauses a script or animation.
Syntax
Pause( );
Return Value
None
Remarks
There is no way to restart a script once paused, so Pause is useful only in animations.

A representative example of a script 44 for implementing an interactive animation sequence is shown in Table IV. This script supports an animation sequence for presenting an image of a "cat" that chases a cursor as the cursor moves from one position to the next on a displaced screen. Thus, for each frame of the animation sequence, the location of the cat is dependent upon the location of the cursor. Referring now to Table IV, the first two lines of the script define data values for local variables. Specifically, statement 3 assigns a value of "five" to the local variable "dx". Likewise, the local variable "dy" is set to a value of "5" in statement 4. Statements 5 and 6 represent a conditional decision-making loop. Specifically, the local variable "dx" is set to a value of "–5" in the event that the x-coordinate for the cursor is less than zero. The conditional decision-making loop defined by statements 7–8 are similar to statements 3–4, with the exception that statements 7–8 define a new value for the local variable "dy" in the event that the y-coordinate of the cursor location is less than zero. In statement 9, the "Cell" command defines a drawing of the graphical image of the cat at the pixel coordinates defined by the values assigned to the local variables "dx" and "dy" for a specified time period of "6"×1/60 of a second or 0.1 seconds. The is associated with a GOB having the identifier "id_cat", is dependent upon the location of the cursor and is responsive to a change in either the x- or y-coordinates of the cursor.

TABLE IV

| | |
| --- | --- |
| 1. | //"cat" that closes the cursor |
| 2. | //10 fps. |
| 3. | dx=5; |
| 4. | dy=5; |
| 5. | if (XMouse This( ) < 0); |
| | dx=–5; |
| 6. | End; |
| 7. | if (YMouse This( ) < 0); |
| | dy=–5; |
| 8. | End; |
| 9. | Cell (id_cat, dx, dy, 6); |

Another representative example of an interactive animation sequence is shown in the left-hand column of Table V.

The left-hand column of Table V contains a script for drawing a graphical image that changes location in the "x"-plane at an increasing rate. For this example, the graphical image corresponding to the GOB having the identifier "id_train_cell", and the animation sequence supports the display of the accelerating train moving along a horizontal plane on the screen. This script contains seven statements, including a conditional decision-making branch defined by statements 3–5.

In contrast, the right-hand column of Table V defines a conventional animation table for drawing the same animation sequence. Clearly, this animation table contains many more statements than the script of the preferred scripting system 40 to achieve an identical animation result. It will be appreciated that the animation table requires many more functional statements because this prior animation technique lacks control logic supported by conditional decision-making statements.

TABLE V

| Animation Script | Hard-coded Animation Table | | |
|---|---|---|---|
| | xp | yp | dt |
| xp=10; | 3, | 0, | 6 |
| dx=2; | 7, | 0, | 6 |
| while (xp<640); | 12, | 0, | 6 |
| dx+=1; | 18, | 0, | 6 |
| xp+=dx; | 25, | 0, | 6 |
| Cell (id_train_cell, dx, 0, 6) | 33, | 0, | 6 |
| End; | 42, | 0, | 6 |
| | . | . | . |
| | . | . | . |
| | . | . | . |
| | 592, | 0, | 6 |

Referring now to the script in the left-hand column of Table V, the first two statements define data values to local variables of the script. Specifically, in statement 1, the local variable "xp" is set to a value of "10". Similarly, the local variable "dx" is set to a data value of "2". The decision-making loop defined by statements 3–5 supports the control logic required to rapidly change the location of the graphical image in the x-plane. While the variable "xp" is less than a data value of 640, the value assigned to the local variable "dx" is increased by "one" and the value assigned to the local variable "xp" is increased by the present value assigned to the local variable "dx". In turn, the sixth statement of the script, the "Cell" command, operates to draw a graphical image for the GOB identified by "id_train_cell" at a x-coordinate set by the value assigned to the variable "dx" and a y-coordinate value set to "zero" for a time period of 6.

In contrast, the animation table defined by the right-hand column of Table V includes hard-coded statements defining incremental steps of the graphical image along the x-coordinate. A subsequent statement has a higher value assigned to the variable "xp" than the previous statement to achieve the desired visual result of an accelerating graphical image, specifically an accelerating train. Because each x-coordinate value for this animation sequence is predetermined, the animation table is much harder to modify to accommodate a new implementation, such as a change in the acceleration rate. In comparison, the script on the left-hand column of Table V is much easier to modify, for revised script versions and readily accommodates the addition of signal or test events.

Figure 6:
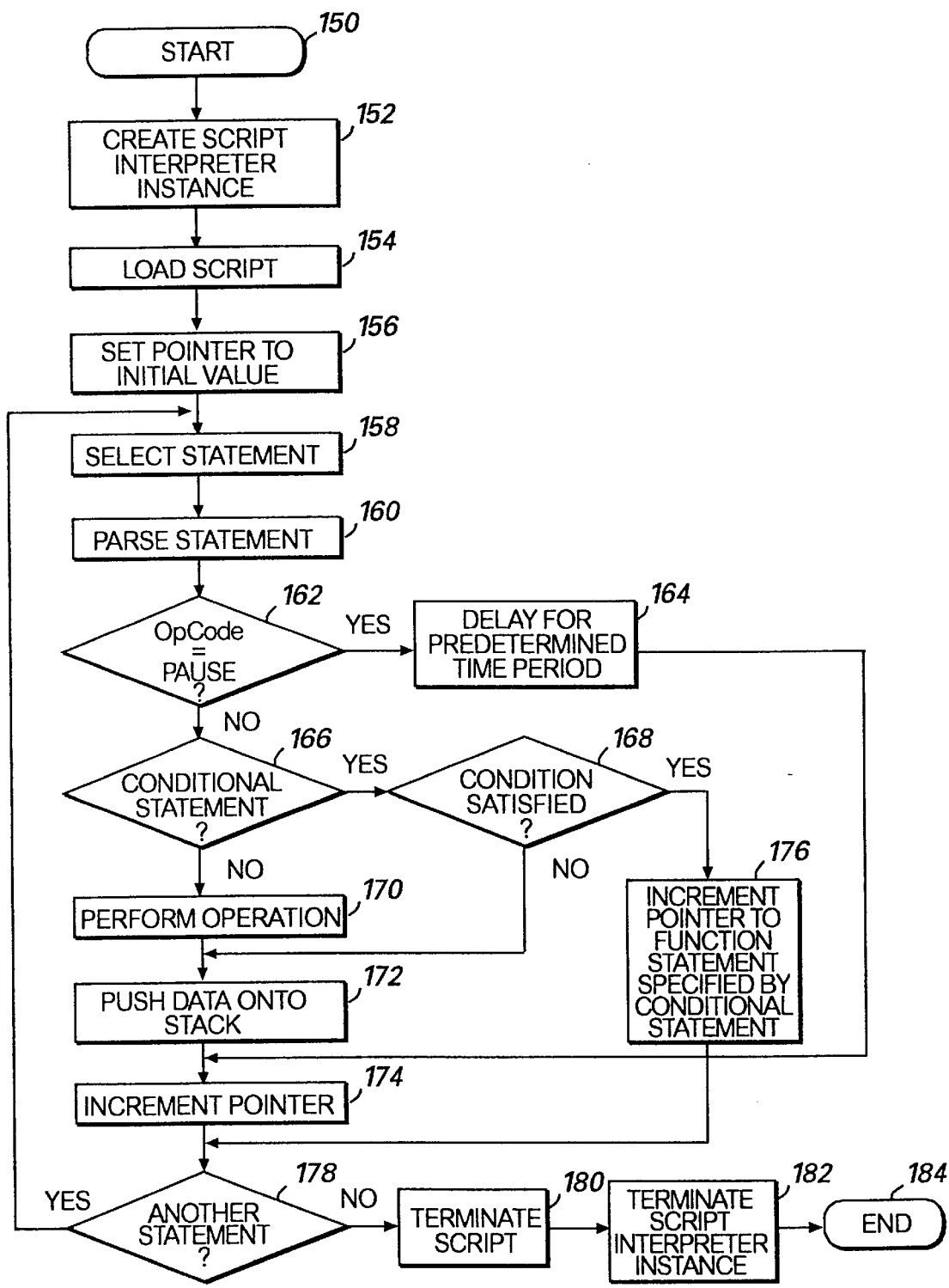
FIG. 6 is a logical flow diagram illustrating a computer implemented process for the preferred embodiment of the present invention.

FIG. 6 is a logical flow diagram illustrating a computer-implemented process for running a script on an instance of a script interpreter in accordance with the preferred embodiment of the present invention. Turning now to FIGS. 1, 2, and 6, a computer-implemented scripting process begins at the START step 150. Typically, the scripting process is initiated in response to detection of a trigger event, such as user activity, by a GOB 46. In response, the GOB 46 determines whether a responsive action should be taken by examining its data structure maintained by the file manager 48. If the GOB's data structure defines a script associated with this trigger event, the GOB 46 creates an instance of a script interpreter 42 in step 152. In turn, the script interpreter 42 loads an attached script 44 in step 154. To begin execution of the function statements in the attached script 44, a pointer of the script interpreter 42 is initialized in step 156. In this manner, the function statements of the script 44 can be executed in proper order, beginning at the function statement identified by the pointer. Thus, in step 158, the function statement identified by the pointer is selected for execution.

In step 160, the function statement is examined by parsing certain items of the selected function statement. In particular, the operation code, variable names, and data items are parsed by the script interpreter instance.

In step 162, an inquiry is conducted to determine whether the function statement contains a "Pause" command. If so, the "YES" branch is followed to step 164 and a predetermined delay defined by this statement is implemented. Upon expiration of this predetermined delay, a branch is followed from step 164 to step 176. In contrast, if the inquiry in step 162 is negative, the "NO" branch is followed to step 166. In step 166, a determination is made whether the selected function statement is a "conditional" or a decision-making statement. If so, the "YES" branch is followed to step 168. Otherwise, the "NO" branch is followed to step 170.

In step 170, the operation defined by the selected function state is conducted. In step 172, data items(s) associated with the operation performed in step 170 are pushed onto the stack. In turn, the pointer is incremented in step 174.

In step 168, an inquiry is conducted to determine whether the condition of a conditional statement has been satisfied. If not, the "NO" branch is followed to step 174. Otherwise, the "YES" branch is followed to step 176 and the pointer is set to the appropriate function statement. The process then moves to step 178.

In step 178, an inquiry is conducted to determine whether another statement is listed in the attached script 44. If so, the "YES" branch is followed from step 178 to step 158. However, if the response to the inquiry in step 178 is negative, the "NO" branch is followed to step 180. The attached script 44 is destroyed in step 180 and, in turn, the instance of the script interpreter 42 is destroyed in step 182. Thus, it will be appreciated that the attached script and the script interpreter instance are destroyed in response to execution of each and every function statement in the attached script. The scripting process terminates at the END step 184.

In summary, the present invention provides a computer-implemented method for scripting an animated sequence. An instance of a script interpreter is created. A script is then attached to the script interpreter instance. This attached script comprises function statements for implementing the animated sequence. The function statements of the attached script are executed by the script interpreter instance to conduct the animated sequence. The animated sequence is displayed in response to executed function statements.

The function statements can be executed nonsequentially. For example, a function statement can comprise a conditional decision-making statement for implementing a logical control mechanism. This decision-making statement can include a jump to another function statement within the attached script in response to a specified condition.

For the foregoing, it will be appreciated that the present invention indeed fulfills the needs of the prior art described hereinabove and meets the above-stated objects and advantages. While there has been shown and described the preferred embodiment of the invention, it will be evident to those skilled in the art that various modifications and changes may be made thereto without departing from the spirit and the scope of the invention as set forth in the appended claims and equivalence thereof.

What is claimed is:

1. A computer-implemented method for scripting an animated sequence, comprising the steps of:

creating an instance of a script interpreter;

attaching a script to the script interpreter instance, the attached script comprising function statements for implementing the animated sequence;

executing the function statements of the attached script by the script interpreter instance to conduct the animated sequence; and displaying the animated sequence in response to executed function statements.

2. The process of claim 1, wherein the script interpreter instance is assigned to a graphical object (GOB) comprising an object-oriented program module and having a graphical image associated with the animation sequence.

3. The process of claim 2, wherein the script interpreter instance is invoked in response to an event received by the GOB.

4. The process of claim 3, wherein the event comprises one of a keystroke, an expiration of a predetermined time period, and operation of an input device.

5. The process of claim 4, wherein the input device comprises a mouse operative to control location of a cursor on a screen, and the operation of the input device comprises selection of a button on the mouse when the cursor is positioned proximate to the graphical image of the GOB.

6. The process of claim 2, wherein the script interpreter is operative to communicate with a second GOB to execute another script while execution of the attached script is delayed.

7. The process of claim 1 further comprising destroying the attached script in response to executing the attached script, and destroying the script interpreter instance in response to destroying the attached script.

8. The process of claim 1, wherein the function statements are executed nonsequentially.

9. The process of claim 1, wherein the function statements comprise a conditional decision-making statement for implementing a logical control mechanism for controlling a display of the animation sequence.

10. The process of claim 9, wherein the decision-making statement comprises jumping to another function statement within the attached script.

11. A computer system operative to execute a program module for scripting an animation sequence, comprising:

a processing device;

a memory, coupled to the processing device, for storing the program module; and an output device, coupled to the processing device, for displaying at least one graphical image for the animation sequence, each graphical image associated with a graphical object (GOB) maintained in the memory, the processing device, responsive to instructions of the program module, operative to (a) create an instance of a script interpreter assigned to one of the GOBs;

(b) attach a script to the script interpreter instance, the attached script comprising at least one functional statement for implementing the animated sequence;

(c) execute each function statement of the attached script on the script interpreter instance to conduct the animated sequence;

(d) display the animated sequence on the output device in response to each executed function statement;

(e) destroy the attached script in response to executing the attached script; and (f) destroy the script interpreter instance in response to destroying the attached script.

12. The computer system of claim 11, wherein the script interpreter can communicate with a second GOB to execute another script while execution of the attached script is delayed.

13. The computer system of claim 11, wherein the function statements implement a control logic mechanism for supporting at least one of calculations, queries to another GOB, and queries to another program module.

14. The computer system of claim 11, wherein the function statements are executed in a non-sequential manner.

15. A computer system operative to execute a program module for scripting an animation sequence, comprising:

a processing device;

a memory, coupled to the processing device, for storing the program module, the program module comprising a plurality of objects, including graphical objects (GOBs), a file manager object, and a rendering object; and an output device, coupled to the processing device, for displaying at least one graphical image for the animation sequence, each graphical image corresponding to one of the GOBs, the processing device, responsive to instructions of the program module, operative to (a) create an instance of a script interpreter for one of the GOBs in response to the GOB receiving an event, wherein the GOB examines a template maintained by the file manager object to determine whether the event corresponds to creation of the script interpreter instance;

(b) attach a script to the script interpreter instance, the attached script comprising at least one function statement for implementing the animated sequence;

(c) execute each function statement of the attached script on the script interpreter instance to conduct the animated sequence;

(d) display the animated sequence on the output device in response to execution of the attached script, wherein the GOB instructs the rendering object to draw the graphical images of the animation sequence;

(e) destroy the attached script in response to execution of the attached script; and (f) destroy the script interpreter instance in response to destruction of the attached script.

16. A computer-readable medium on which is stored a program module for scripting an animation sequence, the program module comprising instructions which, when executed by the programmed computer, performs the steps of:

creating an instance of a script interpreter;

attaching a script to the script interpreter instance, the attached script comprising control logic for implementing the animated sequence;

executing the attached script on the script interpreter instance to conduct the animated sequence; and displaying the animated sequence in response to executing the attached script.

17. The computer readable medium of claim 16, wherein the script interpreter instance is assigned to a graphical object (GOB) comprising an object-oriented program module and having at least one graphical image associated with the animation sequence, and wherein the script interpreter instance is invoked in response to an event received by the GOB.

18. The computer readable medium of claim 17, wherein the control logic supports interactive animation by enabling the attached script to communicate with another GOB or another program module within the computer readable medium.

19. The computer readable medium of claim 16, wherein the program module further comprises instructions which, when executed by the programmed computer, performs the steps of:

destroying the attached script in response to executing the attached script; and destroying the script interpreter instance in response to the destruction of the attached script.

20. The computer-readable medium of claim 16, wherein the program module further comprises a plurality of objects, including graphical objects (GOBs) having a graphical image associated with the animation sequence, a file manager object for managing a plurality of templates assigned to the GOBs, each template defining a data structure for a corresponding one of the GOBs, and a rendering object for drawing the animation sequence.

21. A computer-readable medium on which is stored a program module for scripting an animation sequence, the program module comprising:

a script interpreter for executing an attached script comprising function statements for implementing the animation sequence;

a plurality of graphical object (GOBs), each GOB assigned to the script interpreter and having a graphical image associated with the animation sequence;

a file manager object for managing a plurality of templates assigned to the GOBs, each template defining a data structure for a corresponding one of the GOBs; and a rendering object for rendering each graphical image represented by a corresponding one of the GOBs in response to the function statements executed by the script interpreter.

22. A computer-readable medium of claim 21, wherein the script interpreter is operative to execute at least one of the function statements in response to an event received by one of the GOBs assigned to the script interpreter.

23. The computer readable medium of claim 22, wherein the script interpreter is operative to communicate with a second one of the GOBs to execute another script while delaying execution of the attached script.

* * * * *